April 5, 1927. 1,623,800

L. A. McDOWELL

FRONT SEAT SUPPORT

Filed June 14, 1926

Inventor
Lamont A. McDowell

By

Attorneys

Patented Apr. 5, 1927.

1,623,800

UNITED STATES PATENT OFFICE.

LAMONT A. McDOWELL, OF DETROIT, MICHIGAN, ASSIGNOR TO HUPP MOTOR CAR COMPANY, OF DETROIT, MICHIGAN, A CORPORATION OF VIRGINIA.

FRONT-SEAT SUPPORT.

Application filed June 14, 1926. Serial No. 115,983.

This invention relates generally to seats for automobiles and more particularly to the front seat constructions of such vehicles.

An object of the present invention is to provide an all-metal front seat which can be placed in an automobile as a unit and quickly secured to the flooring thereof.

Another object is to provide a seat in which all of the parts can be quickly stamped out to the desired shape and may be readily assembled, thus insuring uniformity and providing a strong, light and cheaply manufactured seat unit.

With these and other objects in view, the invention resides in certain novel features of construction, combinations and arrangements of parts as will be more fully described and particularly pointed out in the appended claims.

In the accompanying drawings:—

Figure 1:
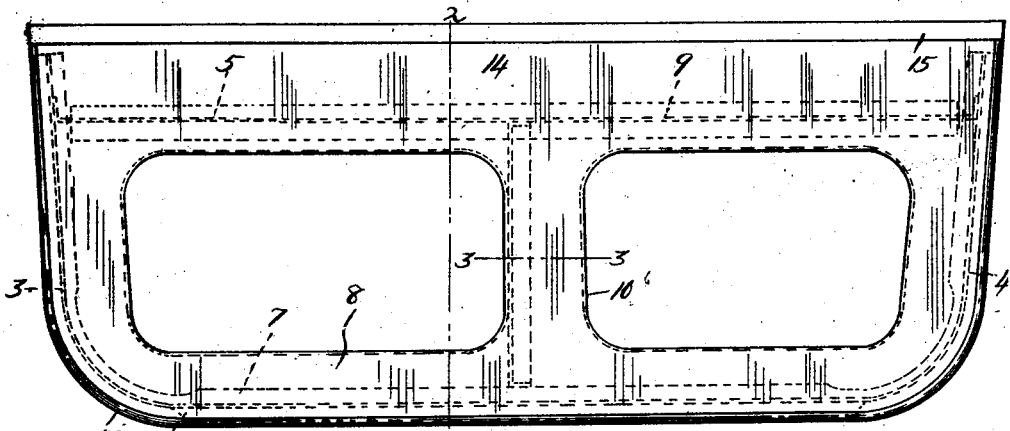
Figure 1 is a plan view of the seat with the back removed.

Referring now to the drawings, wherein like reference characters indicate like parts, a front seat base is designated at 1 consisting of a heel panel forming a front portion 2 and side portions 3 and 4 between which a back channel bar 5 is preferably welded adjacent the ends thereof.

The lower straight edges of the heel panel are horizontally flanged as at 6 to provide means for securing the base to the flooring of an automobile, while the upper edges thereof are likewise horizontally flanged as shown at 7 to form supporting means for a seat plate 8, which is preferably welded thereto at the flanged portions. The upper flange 9 of the back channel bar 5 is also preferably welded to the seat plate.

Formed in the seat plate centrally thereof are flanged openings 10 which have a two-fold purpose. With the base attached to the flooring of the automobile and the seat plate in position on the base a box is formed which may serve as a tool box or battery receptacle as desired, the articles being placed in the box through the openings 10.

Figure 3:
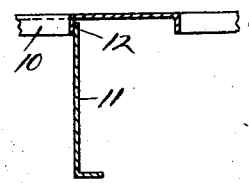
Figure 3 is a section through line 3—3 of Fig. 1.
Figure 4:
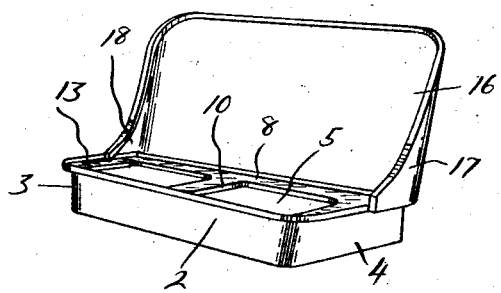
Figure 4 is a perspective view of the entire seat unit.

A cross bar is designated at 11 connecting the front portion 2 and the back channel bar 5, being preferabbly welded thereto, and also to a flange in one of the openings 10, as shown at 12 in Fig. 3. Around the front and side edges of the seat plate is formed an integral beading 13 for retaining a cushion (not shown) in place.

Figure 2:
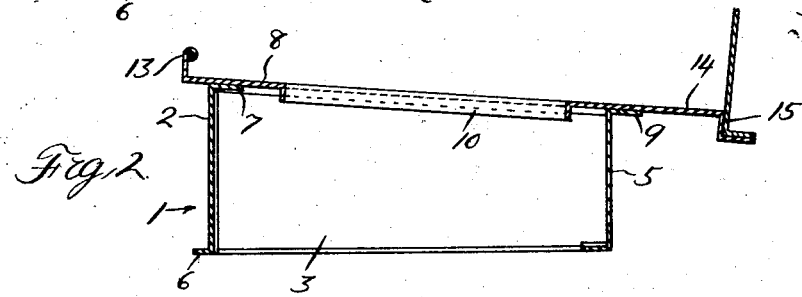
Figure 2 is a section through line 2—2 of Fig. 1.

The rear portion of the seat plate is extended past the back channel bar overhanging the same as at 14 and terminating in a back support 15 formed by stepping the metal, as clearly shown in Figure 2. A seat back is designated at 16, the lower edge of which is horizontally flanged and which rests in the support 15, being preferably welded thereto.

Integral side arms 17 and 18 extend forwardly from the back, the lower edges thereof overlapping the beading 13 and being welded thereto. These side arms at their lower edges extend forwardly substantially half way to the front of the seat, as shown at 19. The upper edges of the arms starting at the beading 13 taper backward and upwardly, gradually merging into the upper edge of the back. The upper edges of the back and side arms may be formed in any convenient manner so as to accommodate suitable upholstery (not shown).

From the foregoing it is apparent that a very compact, all metal seat unit has been provided which is simple in construction and cheaply manufactured and which can be easily and quickly installed in the front portion of an automobile.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. A sheet metal seat structure comprising a base, a seat plate supported upon said base and having its rear portion overhanging said base exteriorly thereof and terminating in a stepped support spaced from the rear wall of said base, and a back having the lower edges thereof flanged to seat in said stepped support.

2. A sheet metal seat structure comprising a base, a seat plate supported upon said base, and having its rear portion overhanging said base exteriorly thereof and terminating in a stepped support spaced from the rear wall of said base, a back having the lower edges thereof flanged to seat in said stepped support, and sidearms formed integral with said back, the lower edges thereof being secured to the seat plate and the upper edges thereof tapering rearwardly and upwardly to connect with the upper edges of the back.

3. A sheet metal seat structure comprising a base including vertical front and rear walls provided at their upper edges with rearwardly extending horizontal flanges, a seat plate supported upon and secured to said flanges and provided with a rearwardly extending portion overhanging said base exteriorly thereof, and terminating in a stepped support and a back secured to said support, all of said parts being secured together to form a separate integral seat unit.

4. A sheet metal seat structure comprising a base, a seat plate secured to said base, and provided with an opening having a depending flange and a cross-bar having its ends secured to the front and rear walls of said base and having its upper edges secured to the depending flange of said seat plate.

In testimony whereof I affix my signature.

LAMONT A. McDOWELL.